United States Patent
Keselman et al.

(10) Patent No.: US 11,546,149 B2
(45) Date of Patent: *Jan. 3, 2023

(54) HOMOMORPHIC KEY DERIVATION

(71) Applicant: INTUIT INC., Mountain View, CA (US)

(72) Inventors: Gleb Keselman, Modiin (IL); Yaron Sheffer, Hod HaSharon (IL); Alon Rosen, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 152 days.

This patent is subject to a terminal disclaimer.

(21) Appl. No.: 17/202,280

(22) Filed: Mar. 15, 2021

(65) Prior Publication Data

US 2021/0203494 A1    Jul. 1, 2021

Related U.S. Application Data

(63) Continuation of application No. 16/153,414, filed on Oct. 5, 2018, now Pat. No. 10,985,912.

(51) Int. Cl.
*H04L 29/06* (2006.01)
*H04L 9/08* (2006.01)
*H04L 9/00* (2022.01)

(52) U.S. Cl.
CPC ............ *H04L 9/0861* (2013.01); *H04L 9/008* (2013.01); *H04L 9/0825* (2013.01); *H04L 9/0827* (2013.01)

(58) Field of Classification Search
CPC ..... H04L 9/0861; H04L 9/008; H04L 9/0825; H04L 9/0827
USPC ....................................................... 380/282
See application file for complete search history.

(56) References Cited

U.S. PATENT DOCUMENTS

| | | | |
|---|---|---|---|
| 9,565,020 B1* | 2/2017 | Camenisch | H04L 9/0863 |
| 10,764,036 B1* | 9/2020 | Griffin | H04L 63/06 |
| 2010/0215175 A1 | 8/2010 | Newson | |
| 2013/0247230 A1* | 9/2013 | Parann-Nissany | H04L 9/0894 726/30 |
| 2015/0106618 A1 | 4/2015 | Nair | |
| 2015/0143111 A1 | 5/2015 | Parann-Nissany | |
| 2015/0372812 A1 | 12/2015 | Parann-Nissany | |
| 2017/0223008 A1 | 8/2017 | Camenisch | |
| 2018/0076956 A1 | 3/2018 | Camenisch | |
| 2019/0377889 A1* | 12/2019 | Mertens | G06F 21/60 |

OTHER PUBLICATIONS

International Search Report issued in PCT/US2019/043784 dated Oct. 29, 2019.
Written Opinion issued in PCT/US2019/043784 dated Oct. 29, 2019.

* cited by examiner

*Primary Examiner* — Evans Desrosiers
(74) *Attorney, Agent, or Firm* — DLA Piper LLP (US)

(57) ABSTRACT

A processor of a remote crypto cluster (RCC) may receive a public key from a client device through at least one network. The processor of the RCC may obtain an encrypted specific key and a blinded project key from at least one data source through the at least one network. The processor of the RCC may derive a derived key in blind based on the encrypted specific key and the blinded project key. The processor of the RCC may send the derived key in blind to the client device.

20 Claims, 5 Drawing Sheets

HOMOMORPHIC KEY DERIVATION

CROSS-REFERENCE TO RELATED APPLICATIONS

This application is a Continuation Application of U.S. application Ser. No. 16/153,414 filed Oct. 5, 2018 entitled HOMOMORPHIC KEY DERIVATION. The content of the above-identified application is incorporated herein by reference in its entirety.

DETAILED DESCRIPTION OF SEVERAL EMBODIMENTS

Many computer applications may require cryptographic operations for multiple clients, users, or processes. For example, multiple clients may require separate keys for accessing applications hosted by servers or cloud-based systems through one or more networks. To enhance security in case of a breach, server/cloud side key management systems may be separated. For example, if an attacker breaches one key server, they may only gain a small number of the total keys, and may have to breach additional servers separately to gain more keys. Some embodiments described herein may enable multitenant key management architecture (e.g., wherein a central manager may perform cryptographic operations for multiple clients) in a distributed fashion such that in the event of a breach, even by a legitimate user (e.g., using one of the legitimate keys), no sensitive keys may be revealed to the breaching party. For example, some embodiments described herein may be configured to derive keys in the blind, so that only a client can reveal a key. Disclosed hardware arrangements and homomorphic key derivation methods may ensure security in systems employing low-cost, multitenant architectures.

Figure 1:
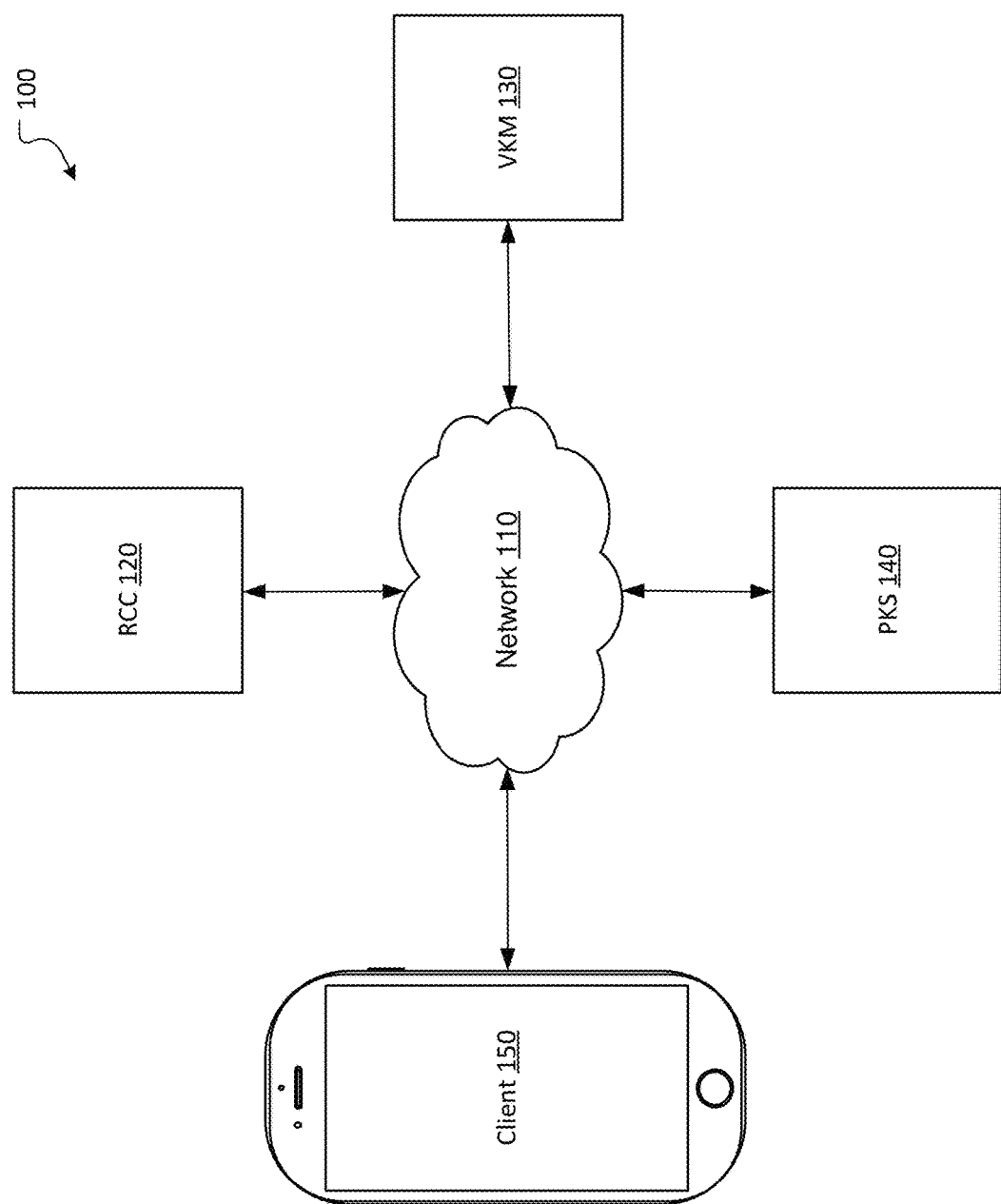
FIG. 1 shows a system configured to perform homomorphic key derivation according to an embodiment of the present disclosure.
Figure 2:
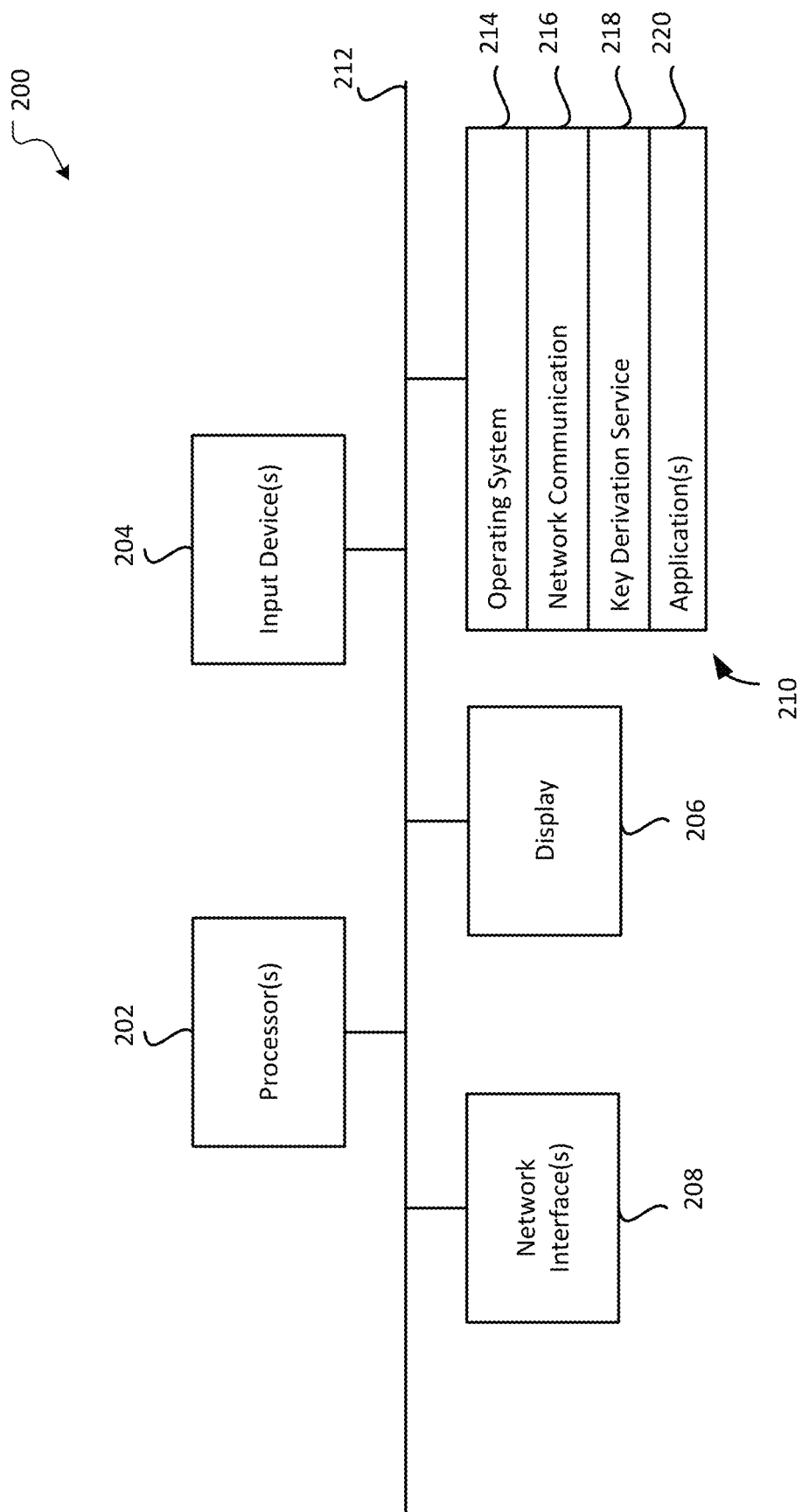
FIG. 2 shows a computing device according to an embodiment of the present disclosure.

FIG. 1 shows a system 100 configured to perform homomorphic key derivation according to an embodiment of the present disclosure. System 100 may include elements such as a remote crypto cluster (RCC) 120, virtual key manager (VKM) 130, project key server (PKS) 140, and/or at least one client 150. Each of these elements may include one or more physical computing devices (e.g., which may be configured as shown in FIG. 2). In some embodiments, client 150 may be any device configured to provide access to remote applications. For example, client 150 may be a smartphone, personal computer, tablet, laptop computer, or other device.

The elements may communicate with one another through at least one network 110. Network 110 may be the Internet and/or other public or private networks or combinations thereof. For example, in some embodiments, at least RCC 120, VKM 130, and PKS 140 may communicate with one another over secure channels (e.g., one or more TLS/SSL channels). In some embodiments, communication between at least some of the elements of system 100 may be facilitated by one or more application programming interfaces (APIs). APIs of system 100 may be proprietary and/or may be examples available to those of ordinary skill in the art such as Amazon® Web Services (AWS) APIs or the like.

Specific examples of the processing performed by the elements of system 100 in combination with one another are given below. However, the roles of RCC 120, VKM 130, PKS 140, and client 150 may be summarized as follows. RCC 120 may compute an encrypted derived key using data from the other elements and send the encrypted derived key to client 150. VKM 130 may generate and/or distribute data used by other system 100 elements for key generation and/or derivation, such as a project key (K) and one or more specific keys ($s_j$), the uses of which are described in greater detail below. PKS 140 may generate and/or distribute data used by other system 100 elements for key generation and/or derivation, such as a project-wide RCC key (z), a project-wide client key (w), and one or more blinding values ($b_i$), the uses of which are described in greater detail below. Client 150 may generate public/private key pairs, use the public key to request an encrypted derived key from RCC 120, and use the private key to decrypt the encrypted derived key, thus being the only device that ever has clear access to the derived key. The segmented roles performed and security features implemented by RCC 120, VKM 130, PKS 140, and client 150 may provide highly secure key derivation in a distributed setting, for example by ensuring that only the client 150 ever gets the derived key in the clear.

RCC 120, VKM 130, PKS 140, and client 150 are each depicted as single devices for ease of illustration, but those of ordinary skill in the art will appreciate that RCC 120, VKM 130, PKS 140, and/or client 150 may be embodied in different forms for different implementations. For example, RCC 120, VKM 130, and/or PKS 140 may include a plurality of devices. In another example, a plurality of clients 150 may be connected to network 110 and may use the key derivation services described herein. A single user may have multiple clients 150, and/or there may be multiple users each having their own client(s) 150. Furthermore, as noted above, network 110 may be a single network or a combination of networks, which may or may not all use similar communication protocols and/or techniques.

FIG. 2 is a block diagram of an example computing device 200 that may implement various features and processes as described herein. For example, computing device 200 may function as RCC 120, VKM 130, PKS 140, or client 150, or a portion of any of these elements, in some embodiments. Computing device 200 may be implemented on any electronic device that runs software applications derived from instructions, including without limitation personal computers, servers, smart phones, media players, electronic tablets, game consoles, email devices, etc. In some implementations, computing device 200 may include one or more processors 202, one or more input devices 204, one or more display devices 206, one or more network interfaces 208, and one or more computer-readable mediums 210. Each of these components may be coupled by bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Key derivation service instructions 218 may include instructions that perform the various homomorphic key derivation functions as described herein. Key derivation service instructions 218 may vary depending on whether computing device 200 is functioning as RCC 120, VKM 130, PKS 140, or client 150. For example, RCC 120 may include key derivation service instructions 218 for requesting data from other devices and using it to compute an encrypted derived key. Client 150 may include key derivation service instructions 218 for generating public/private key pairs and using the private key to decrypt the encrypted derived key. VKM 130 and/or PKS 140 may include key derivation service instructions 218 for generating and/or transmitting data used by other devices.

Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
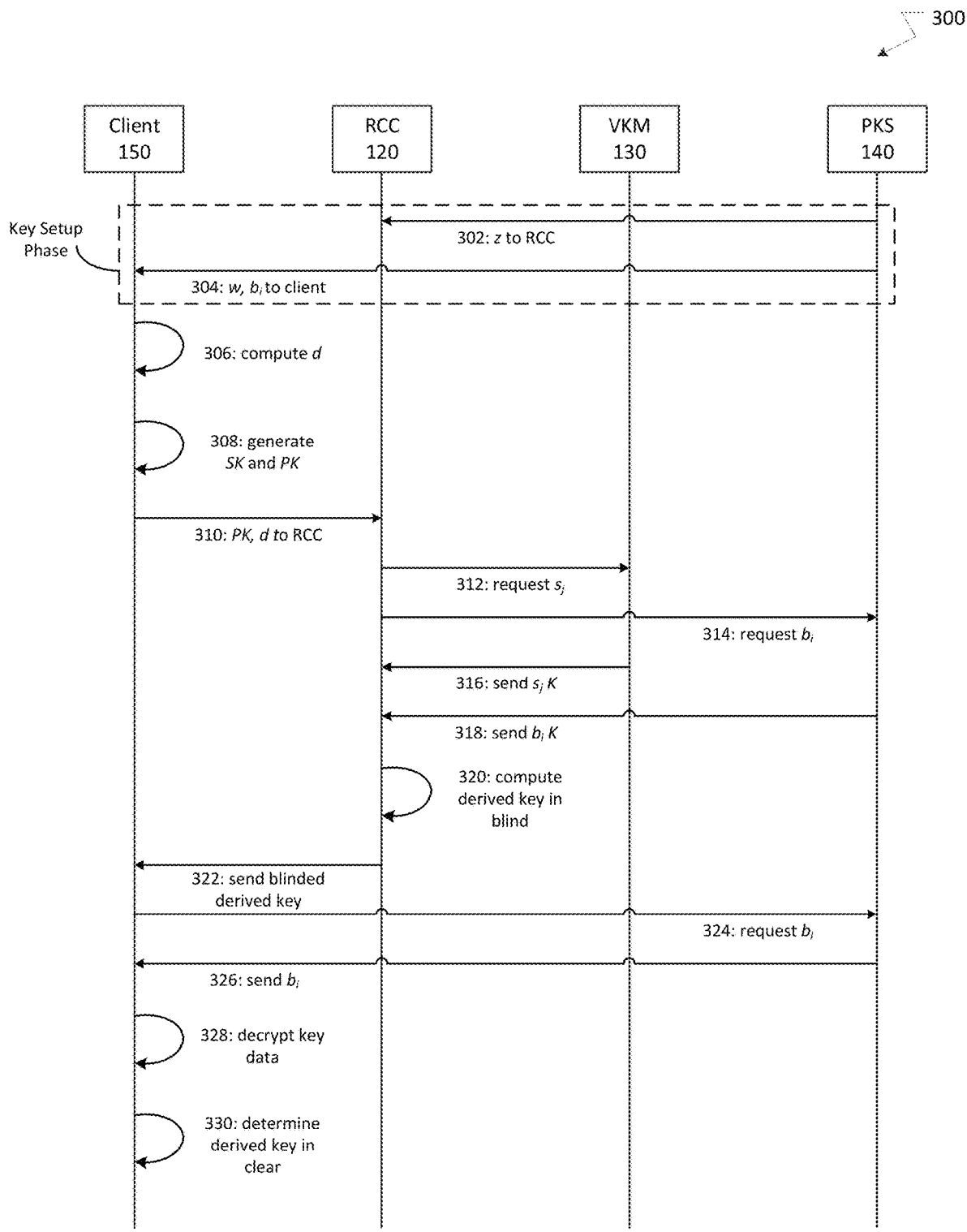
FIG. 3 shows a homomorphic key derivation process according to an embodiment of the present disclosure.

FIG. 3 shows a homomorphic key derivation process 300 according to an embodiment of the present disclosure. The entire system 100 may work together to perform process 300 in a distributed manner. Process 300 may yield a derived key in clear, but only on client 150. Because of the homomorphic nature of the key, RCC 120 may perform key derivation operations responsive to client 150 requests entirely in blind. Furthermore, VKM 130 and/or PKS 140 may provide data used by RCC 120 for the key derivation operations, so that RCC 120 does not have all data used to derive the key on its own. This arrangement may yield a low-cost, multitenant system 100 with strong protection of stored and/or managed data. Process 300 is presented as deriving a single key for a single project or use, and process 300 may be performed repeatedly to generate multiple keys in some embodiments if desired.

Some portions of process 300 are described as using specific equations. The equations described herein may be used as presented by system 100 in some embodiments. However, it will be clear to those of ordinary skill in the art that some portions of process 300 may be performed with modifications to the example equations and/or with different processing altogether. The following definitions may be useful for understanding the example equations presented herein:

n: number of clients, i∈[n]
m: number of specific keys, j∈[M]
$s_j$: specific key
$b_i$: blinding value of client
DD: derivation data
w: project-wide client key
z: project-wide RCC key
K: project key (or master key)
d: intermediate derived value
h: client's ephemeral public key
r: a random value as used for ElGamal encryption which may be generated anew for each encryption
g, p: generator, prime (respectively): system wide constants
Note: all arithmetic operations below are performed modulo p in the disclosed examples.

Keys may be used to access projects, which may be any protected services or processes. When a project is first created and/or registered with system 100, system 100 may perform a key setup phase. The key setup phase, consisting of actions 302 and 304, is shown herein as part of process 300. However, in some embodiments, process 300 may include actions 302 and 304 only once (e.g., the first time process 300 is performed for a particular project), and actions 302 and 304 may be omitted for future instances of process 300 for the same project.

At 302, PKS 140 may generate z for the project. PKS 140 may send z to RCC 120. The same z may be used for all clients 150 authorized to access the project, for example to perform key derivation functions (e.g., HKDF or another function) as described below. At 304, PKS 140 may generate w and $b_i$ for the project. PKS 140 may send w and $b_i$ to client 150. PKS 140 may generate and send a separate w and $b_i$ for each client 150 authorized to access the project. As a result, z may be available throughout system 100, but $b_i$ may be known only to PKS 140 and client 150. In some embodiments, VKM 130 may perform actions 302 and 304 (e.g., PKS 140 may perform other tasks or be omitted altogether from system 100 in such embodiments).

As a result of the processing at 302 and 304, key derivation within process 300 may begin with the preconditions that client 150 has w and $b_i$, and RCC 120 has z. Further preconditions may include VKM 130 having an encrypted specific key $s_j \cdot K$ and, for each client 150, a blinded project key $b_i \cdot K$. With these preconditions in place, system 100 may be configured to use DD to derive a unique key from $s_j$.

At 306, client 150 may compute d. For example, client 150 may compute d according to the following equation: $d = HKDF_w^{2048}(DD)$.

At 308, client 150 may generate a public/private key pair (e.g., public key PK and private (or secret) key SK. In some embodiments, client 150 may use ElGamal to generate the key pair, although other key algorithms may be used in other embodiments. If client 150 uses ElGamal, for example, $PK = (g;h) = (g; g^{SK})$.

At 310, client 150 may send PK to RCC 120. In some embodiments, client 150 may send PK to RCC 120 as part of, or subsequent to, a request message requesting the derived key.

At 312, RCC 120 may request $s_j$ from VKM 130, and at 314, RCC 120 may request $b_i$ from PKS 140. In response, at 316, VKM 130 may send $s_j \cdot K$ to RCC 120, and at 318, PKS 140 may send $b_i \cdot K$ to RCC 120, where $s_j \cdot K$ may be an encrypted specific key, and $b_i \cdot K$ may be a blinded project key.

At 320, RCC 120 may use PK, $s_j \cdot K$, and $b_i \cdot K$ to compute the encrypted derived key in blind. In some embodiments, the computation may proceed as follows. First, RCC 120 may compute the following:

$$\frac{sj \cdot K}{bi \cdot K} = \frac{sj}{bi}.$$

Then, RCC 120 may compute the following: $(g^r; h^r \cdot d)^{z \cdot (sj/bi)} \rightarrow ((g^r)^{z \cdot (sj/bi)}; (h^r \cdot d)^{z \cdot (sj/bi)}) = ((g^r)^{z \cdot (sj/bi)}; (h^r)^{z \cdot (sj/bi)} \cdot d^{z \cdot (sj/bi)})$, or if r' is defined as $$r' = r \cdot z \cdot (s_j/b_i), \left(g^{r'}; h^{r'} \cdot d^{z\left(\frac{s_j}{b_i}\right)}\right) = E_{ncPK}(d^{z \cdot (sj/bi)}; r').$$

Next, RCC 120 may perform reencryption. $ReEnc(g^r; h^r \cdot m)$ may be defined as $(g^{r+t}; h^{r+t} \cdot m) = Enc(m; r+t)$ for a random t. This may be a form of rerandomization wherein, when decrypted, the plaintext is again m. For example, RCC 120 may pick a random value for t and may reencrypt the value as follows:

$$((g^r)^{z \cdot (sj/bi)} \cdot g^t; (h^r)^{z \cdot (sj/bi)} \cdot d^{z(sj/bi)} \cdot h^t) = \left(g^{rz\left(\frac{sj}{bi}\right)+t}; h^{rz\left(\frac{sj}{bi}\right)+t} \cdot d^{z \cdot (sj/bi)}\right).$$

This reencrypted value may be the encrypted derived key data in blind.

The preceding processing at 320 may be one example of computation performed to generate an encrypted derived key in blind. However, other embodiments may perform different specific computations to generate the key. At 322, RCC 120 may send the data generated at 320 to client 150.

In some embodiments, $b_i$ may change over time. For example, PKS 140 may generate a new $b_i$ periodically, after each request from RCC 120 at 314, or according to some other logic. For example, PKS 140 may generate $b_i$ as a random or pseudorandom value. At 324, in some embodiments, client 150 may request $b_i$ to ensure that client 150 has the same $b_i$ that RCC 120 received at 318. At 326, PKS 140 may send $b_i$ in response to the request from client 150. In embodiments wherein $b_i$ does not change, client 150 may use $b_i$ received at 304, or client 150 may be configured to always request $b_i$ at 324 so that client 150 need not know whether PKS 150 is configured to generate random $b_i$, for example.

At 328, client 150 may decrypt the encrypted derived key. For example, client 150 may perform the following decryption operation in some embodiments, yielding derived key data in clear: $[d^{z \cdot (sj/bi)}]^{bi} = d^{z \cdot sj}$. Finally, client 150 may obtain the derived key in the clear, for example using the HKDF key derivation function on the derived key data in clear as follows: DerivedKey=$HKDF_w^{256}(d^{x \cdot sj})$.

At 330, as a result of decryption at 328, client 150 may have the derived key in the clear. At this point, client 150 may use the derived key for any purpose.

Figure 4:
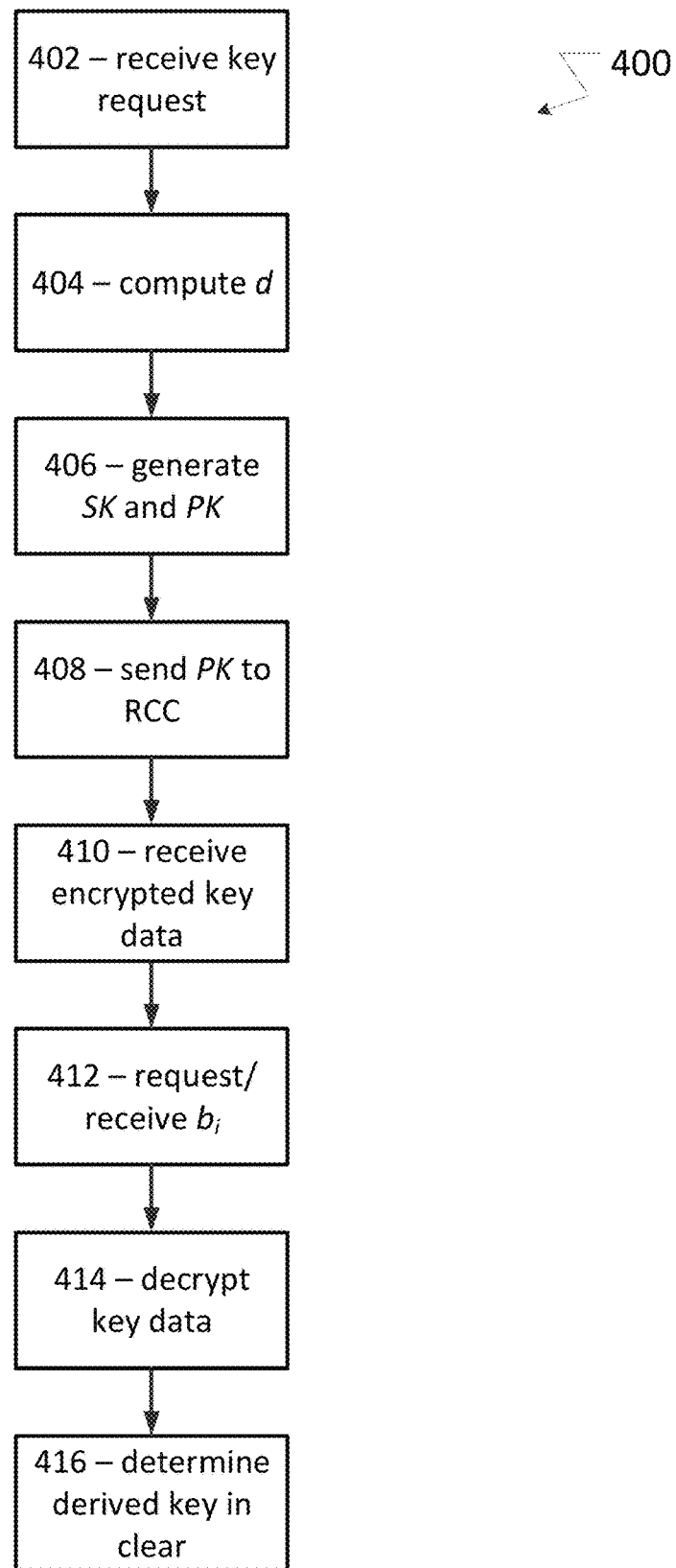
FIG. 4 shows a derived key request and decryption process according to an embodiment of the present disclosure.

FIG. 4 shows a derived key request and decryption process 400 according to an embodiment of the present disclosure. Process 400 may be a client-side process performed by client 150 in the context of system 100 process 300 described above. From the perspective of client 150, the arrangement and/or specific roles of RCC 120, VKM 130, and PKS 140 within process 300 may be immaterial. The purpose of process 400 may be to supply a key required by client 150 to perform some task. Process 400 illustrates the only possibility within system 100 for a derived key to be exposed in the clear, which may only be available at client 150. Client 150 may only be able to receive keys to which it is entitled (e.g., which it can decrypt itself) in the clear, as no other element of system 100 has or can derive any keys in the clear.

At 402, client 150 may receive a request to retrieve a derived key. For example, a user may submit a request for a key through a user interface of client 150, or an automated process of client 150 may request the key. Upon receiving the request, client 150 may begin working to gather data for determining the derived key.

At 404, for example, client 150 may compute d, and at 406, client 150 may generate SK and PK. Specific examples of processing performed by client 150 to accomplish these tasks are given above at 306 and 308 of process 300, respectively.

At 408, client 150 may send PK to RCC 120. At 410, client 150 may receive encrypted key data from RCC 120 in response. From the perspective of client 120, the processing performed by RCC 120 to generate the encrypted key data may be unknown. However, regardless of how the encrypted key data has been generated, the data received by client 150 may always be encrypted. As a result, if client 150 were to somehow request incorrect encrypted key data at 408 or receive incorrect encrypted key data at 410, the data is not exposed either during transmission to client 150 over network 110 or on client 150 itself.

At 412, in some embodiments, client 150 may request and receive a current $b_i$. At 414, as described above, client 150 may use $b_i$ and SK to decrypt the data received at 410. Assuming $b_i$ is correct and SK corresponds to the PK associated with the received encrypted key data, client 150 may determine the derived key in the clear at 416. Otherwise (e.g., if client 150 were to somehow request incorrect encrypted key data at 408 or receive incorrect encrypted key data at 410), client 150 may be unable to determine the derived key in the clear. This means client 150 may only be able to decrypt a key it is authorized to decrypt, and may not be able to decrypt keys belonging to other clients 150, users, or processes. At this point, the derived key may be in the clear and may be used by other processes being executed by client 150 as desired.

Figure 5:
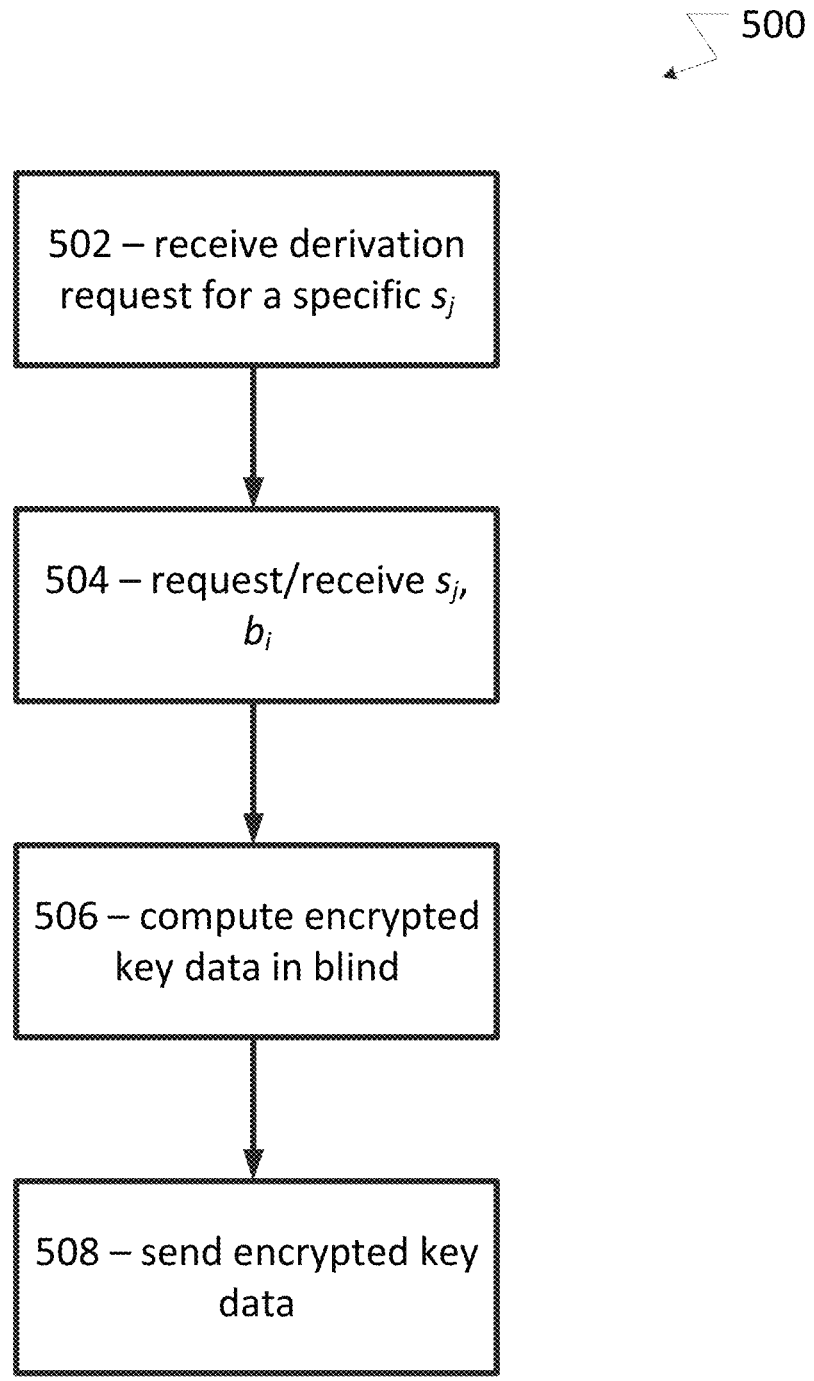
FIG. 5 shows an encrypted key derivation process according to an embodiment of the present disclosure.

FIG. 5 shows an encrypted key derivation process 500 according to an embodiment of the present disclosure. Process 500 may be a server-side process performed by RCC 120 in the context of system 100 process 300 described above. RCC 120 may perform process 500 in response to receiving a request from client 150 (e.g., including PK) to return a derived key. RCC 120 may derive the key by process 500 completely in blind, so that RCC 120 may never have access to the key itself. Accordingly, if RCC 120 is compromised, or if the request from client 150 is fraudulent (e.g., such that client 150 does not actually have the correct SK), RCC 120 may be unable to reveal any sensitive data in an unencrypted state.

At 502, RCC 120 may receive a request for a key from client 150. As described above, the request may include data defining the specific key to be returned (e.g., a specific PK). At 504, RCC 120 may request and receive additional data used for deriving the key (e.g., $s_j$ from VKM 130 or PKS 140 and/or $b_i$ from VKM 130 or PKS 140), as described above.

At 506, RCC 120 may compute the encrypted key data and, at 508, send the encrypted key data to client 150 in response to the request received at 502. Specific examples of processing performed by RCC 120 to compute the encrypted key data are given above at 320 of process 300. As noted above, RCC 120 may compute the encrypted key data without having the underlying key itself exposed in clear at any point during the computation. Accordingly, if RCC 120 is breached, no sensitive data may be available from RCC 120 in clear. Also note that because VKM 130 and PKS 140 only generate and/or store components used to derived the key that are not individually useful for decrypting the key, a breach of VKM 130 and/or PKS 140 may similarly fail to reveal any sensitive data in clear, even in combination with a breach of other systems (e.g., RCC 120).

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A key derivation method comprising:
   obtaining, by a processor of a remote crypto cluster (RCC), a client generated public key of a key pair and a Hashed Message Authentication Code (HMAC)-based key derivation function (HKDF) from a client device through at least one network;
   obtaining, by the processor of the RCC, an encrypted specific key from at least one data source through the at least one network;
   deriving, by the processor of the RCC, intermediate data in blind based on the public key, the HMAC-based HKDF, and the encrypted specific key, wherein the intermediate data is configured to be used to derive a derived key; and sending, by the processor of the RCC, the intermediate data in blind to the client device through the at least one network.

2. The method of claim 1, wherein:
the at least one data source includes a virtual key manager (VKM); and
the method further comprises sending, by a processor of the VKM, the encrypted specific key to the RCC through the at least one network.

3. The method of claim 1, further comprising obtaining, by the processor of the RCC, a blinded project key from the at least one data source through the at least one network, wherein the deriving is further based on the blinded project key.

4. The method of claim 3, wherein:
the at least one data source includes a virtual key manager (VKM); and
the method further comprises sending, by a processor of the VKM, the encrypted specific key and the blinded project key to the RCC through the at least one network.

5. The method of claim 3, wherein:
the at least one data source includes a virtual key manager (VKM) and a project key server (PKS);
the method further comprises sending, by a processor of the VKM, the encrypted specific key to the RCC through the at least one network; and
the method further comprises sending, by a processor of the PKS, the blinded project key to the RCC through the at least one network.

6. The method of claim 1, further comprising sending, by a processor of the at least one data source, a blinding value to the client device, wherein the processor of the RCC is restricted from obtaining the blinding value.

7. The method of claim 6, further comprising deriving, by a processor of the client device, the intermediate data in clear based on the blinding value.

8. The method of claim 7, further comprising obtaining, by the processor of the client device, the derived key from the intermediate data in clear.

9. The method of claim 8, wherein the obtaining of the derived key is performed using a key derivation function.

10. The method of claim 1, further comprising:
generating, by a processor of the client device, public key data; and
sending, by the processor of the client device, the public key data to the processor of the RCC through the at least one network to request the intermediate data.

11. A key derivation system comprising:
a remote crypto cluster (RCC) including a transceiver and a processor configured to:
obtain a client generated public key of a key pair and a Hashed Message Authentication Code (HMAC)-based key derivation function (HKDF) from a client device through at least one network by the transceiver of the RCC;
obtain an encrypted specific key from at least one data source through the at least one network by the transceiver of the RCC;
derive intermediate data in blind based on the public key, the HMAC-based HKDF, and the encrypted specific key, wherein the intermediate data is configured to be used to derive a derived key; and
send the intermediate data in blind to the client device by the transceiver of the RCC.

12. The system of claim 11, further comprising the at least one data source, wherein:
the at least one data source includes a virtual key manager (VKM) including a transceiver and a processor configured to send the encrypted specific key to the RCC through the at least one network by the transceiver of the VKM.

13. The system of claim 11, wherein the processor of the RCC is further configured to obtain a blinded project key from the at least one data source through the at least one network, wherein the deriving is further based on the blinded project key.

14. The system of claim 13, further comprising the at least one data source, wherein:
the at least one data source includes a virtual key manager (VKM) including a transceiver and a processor configured to send the encrypted specific key and the blinded project key to the RCC through the at least one network by the transceiver of the VKM.

15. The system of claim 13, further comprising the at least one data source, wherein:
the at least one data source includes a virtual key manager (VKM) including a transceiver and a processor configured to send the encrypted specific key to the RCC through the at least one network by the transceiver of the VKM; and
the at least one data source includes a project key server (PKS) including a transceiver and a processor configured to send the blinded project key to the RCC through the at least one network by the transceiver of the PKS.

16. The system of claim 11, further comprising the at least one data source including a transceiver and a processor, wherein:
the processor of the at least one data source is configured to send a blinding value to the client device by the transceiver of the at least one data source; and
the processor of the RCC is restricted from obtaining the blinding value.

17. The system of claim 16, further comprising the client device including a processor configured to derive the intermediate data in clear based on the blinding value.

18. The system of claim 17, wherein the processor of the client device is configured to obtain the derived key from the intermediate data in clear.

19. The system of claim 18, wherein the obtaining of the derived key is performed using a key derivation function.

20. The system of claim 11, further comprising the client device including a transceiver and a processor configured to:
generate public key data; and
send the public key data to the processor of the RCC through the at least one network by the transceiver of the client device to request the intermediate data.

* * * * *